(12) United States Patent
Guerra

(10) Patent No.: US 11,570,969 B2
(45) Date of Patent: Feb. 7, 2023

(54) ANIMAL PROTECTIVE DEVICE

(71) Applicant: Emily Guerra, Babylon, NY (US)

(72) Inventor: Emily Guerra, Babylon, NY (US)

( * ) Notice: Subject to any disclaimer, the term of this patent is extended or adjusted under 35 U.S.C. 154(b) by 0 days.

(21) Appl. No.: 17/409,855

(22) Filed: Aug. 24, 2021

(65) Prior Publication Data
US 2022/0061269 A1 Mar. 3, 2022

Related U.S. Application Data

(60) Provisional application No. 63/071,442, filed on Aug. 28, 2020.

(51) Int. Cl.
*A01K 13/00* (2006.01)
(52) U.S. Cl.
CPC .................. *A01K 13/006* (2013.01)
(58) Field of Classification Search
CPC ................ A01K 13/006; A01K 27/001; A61D 2003/003; A61D 3/00
USPC .......................... 119/729, 815, 855
See application file for complete search history.

(56) References Cited

U.S. PATENT DOCUMENTS

| | | | |
|---|---|---|---|
| 3,013,530 A | 12/1961 | Zeman | |
| 3,036,554 A | 5/1962 | Johnson | |
| 3,072,098 A | 1/1963 | Boemle | |
| 3,942,306 A | 3/1976 | Kulka | |
| 4,328,605 A | 5/1982 | Hutchison et al. | |
| 4,476,814 A | 10/1984 | Miller | |
| 4,726,174 A * | 2/1988 | Wilson | A01K 13/006 54/80.2 |
| 6,925,966 B1 * | 8/2005 | Wexler | A61D 9/00 119/815 |
| 7,543,551 B2 * | 6/2009 | Stampoultzis | A61D 9/00 119/850 |
| 8,181,609 B2 | 5/2012 | Ohashi | |
| 10,555,501 B2 * | 2/2020 | Hansen | A01K 13/006 |
| 2009/0090307 A1 * | 4/2009 | Heister | A61D 9/00 119/821 |
| 2010/0024745 A1 * | 2/2010 | Harlow | A61D 9/00 119/856 |
| 2017/0013804 A1 * | 1/2017 | Fachner, Sr. | A01K 27/001 |
| 2019/0104704 A1 * | 4/2019 | Zablow | A01K 13/006 |
| 2021/0015077 A1 * | 1/2021 | Kim | A01K 27/002 |

FOREIGN PATENT DOCUMENTS

WO 9522891 8/1995

* cited by examiner

*Primary Examiner* — Monica L Perry
*Assistant Examiner* — Edgar Reyes
(74) *Attorney, Agent, or Firm* — Hoffmann & Baron, LLP

(57) ABSTRACT

Provided herein is an animal head protection device, or a protective dog collar assembly including an upper stabilization element and a lower support structure. The upper stabilization element is a hexagonally-shaped halo designed for encircling a neck of a dog. The lower support structure is a smaller hexagonally-shaped halo and includes a blocking element to restrict downward movement of a head of the dog.

10 Claims, 4 Drawing Sheets

ANIMAL PROTECTIVE DEVICE

The present invention relates to protective collars worn by an animal, such as a dog, to prevent unnecessary contact of a mouth and/or paws with other parts of the animal's body. The present application is based on and claims priority from Provisional Application bearing U.S. Ser. No. 63/071,442 filed Aug. 28, 2020.

BACKGROUND

Protective dog collars, often called "Elizabethan" collars, have long been used in veterinary medicine to protect against contact between an animal's head and other parts of its body. The collars are mostly used after a medical treatment or procedure, such as surgery, in order to prevent an animal from biting or chewing at sensitive areas and/or dressings or areas below its neck, or from pawing or scratching at dressings or areas on or about its head.

Frequently such collars have taken the general form of truncated cones. Such collars have been closed and thereby retained in place around the animal's neck by such things as interlocking tabs, snaps, lacing, staples, and the like. Such collars frequently need to be offered in a variety of sizes or size ranges to accommodate animals of various sizes, and the effective size range of a particular collar is often limited by the closure mechanism used. Such closure mechanisms are also frequently cumbersome and time-consuming to use.

These cones can be flat-packable device worn mainly by cats and dogs to limit and restrict them from licking, biting, or irritating any incisions, stitches, or wounds on their paws, hind, or back. Although the cone does restrict the animal from reaching, it causes many more problems hindering them from living comfortably. Eating and drinking are almost impossible tasks which cause many pet owners to have to take off the cone to let their pet eat and drink. Climbing and descending stairs can also be extremely dangerous for a pet wearing a protective cone. Further, the shape of the cone causes sound to increase in volume and adversely effects the pet's hearing. The cones also limit the animal's vision to only 15 degrees peripherally. Still further, the cone sits on the neck of the animal and causes redness, itching, and irritation. The animal must be wearing the cone continuously for up to seven days, traditionally.

In addition to the physical restrictions and irritations caused to the pets, pet owners also experience feelings of anxiety and guilt making the pet wear the cone. Many pet owners realize just how awful the cone is for their pet some even have resorted to creating "do-it-yourself" cones using bath towels, duct tape, pool noodles, or even paper plates, which can also cause harm to the pet.

While the Elizabethan cone's functionality has a modicum of success, improvements in both functionality and comfort level of the pet is highly desirable. The cones are not suitable for allowing the animal to eat and drink, go up and down stairs, and sleep comfortably or without danger. The shape of the cone amplifies sound and limits vision causing them to get caught on walls, doorways, stairs, and other obstructions they cannot see. This increases the risk for injury because of the device tremendously. Some patents showing examples of such collars include PCT Publication No. WO 95/22891, and U.S. Pat. Nos. 3,013,530, 3,072,098, 3,036,554, 3,942,306, 4,328,605, 4,476,814 and 8,181,609.

Cone devices currently used block the dog's peripheral vision, leaving them with only 15 degrees of vision laterally. Moreover, the shape of the cone amplifies sound which is disquieting to the dog. The cone sits around the dog's neck and can cause irritation and abrasion. These factors make the dog uncomfortable and uneasy while they are trying to heal post-surgery or from an injury.

Many owners are motivated to remove the cone off their dog while the dog is eating because the length of the cone makes it difficult to reach the food bowl. Owners tend to feel guilty about putting their dog in the cone because it is clear that the cone is uncomfortable for the dog.

There is therefore a need for a collar that is comfortable for a pet to wear, less irritating to the pet, and one that is easily stored, and quickly and easily fitted onto a dog, as well as removed.

SUMMARY

Provided therefor herein is an animal head protection device. The animal head protection device includes an upper stabilization element (USE) having a shape and size for encircling a neck of a quadruped, the USE having a back end and a front end. The USE is designed so that the back end rests on the back of the quadruped while the front end is positioned below the head of the quadruped while the USE encircles its neck. The device also includes a lower support structure (LSS) having a shape and size for encircling the neck and having a back end and a front end, the LSS designed so that the back end rests on the back of the quadruped and is fixed to the back end of the USE while the front end of the LSS is positioned below the front end of the USE while the LSS encircles the neck. The device further includes a blocking element fixed to each of the front ends of the USE and the front end of the LSS, whereby the front end of the USE is urged upwardly toward of the head of the quadruped sufficiently to restrict downward movement of the head.

In an embodiment, the USE of the device is halo-shaped and has a generally planar body having a top surface and a bottom surface and an opening sufficient for the head of the quadruped to pass therethrough, the opening having perimeter dimension P1. In an embodiment, the USE halo is in the shape of a hexagon in plan view. In another embodiment, the LSS of the device has a generally planar body having a top surface and a bottom surface and a central opening sufficient to permit passage of the head of the quadruped and a perimeter P2 which is less than P1 by an amount sufficient to permit the LSS to pass freely through the interior of the USE halo.

In an embodiment, the blocking element of the device is a compressible flexible member which has (i) an unactivated position wherein the blocking element is non-compressed and which permits maximum lateral movement of the head of the quadruped and (ii) an activated condition wherein said quadruped lowers its head and exerts downward force on the top surface of the front end of the USE whereby downward movement of the head is restricted. In an embodiment the LSS restricts rotation of the head with respect to the torso of the quadruped.

In yet another embodiment, the blocking element of the device is a generally planar bendable body having an USE end fixed to the USE and a LSS end fixed to the LSS such that it pushes the USE upwardly from the LSS when activated by downward movement of the head of the quadruped. In another embodiment, the blocking element is comprised of two generally planar bendable bodies fixed between the USE and the LSS.

In another embodiment, the device further includes a harness system, which includes ropes attached to the back end of the USE and the front end of the LSS whereby the device can be secured to said quadruped. In an embodiment the USE, the LSS, and the blocking element are made of a flexibly stiff, or flexibly rigid polymeric material. In an embodiment the USE and LSS are physically separatable elements appended to each other. In an embodiment, the USE and LSS are appended to each other via snap-fit at several locations.

For a better understanding of the present invention, together with other and further objects and advantages, reference is made to the following detailed description, taken in conjunction with the accompanying examples, and the scope of the invention will be pointed out in the appended claims. The following detailed description is not intended to restrict the scope of the invention by the advantages wet forth above.

BRIEF DESCRIPTION OF THE DRAWINGS

Non-limiting and non-exhaustive embodiments of the present invention will be described with reference to the following drawings which are presented by way of example only, wherein like reference numerals (when used indicate corresponding elements throughout the several views unless otherwise specified), and wherein.

DETAILED DESCRIPTION

The present invention is an animal head protection device, or a protective dog collar assembly used to protect quadrupeds, preferably dogs from further injuring themselves post surgery. The device may be typically worn by an animal after a medical procedure in order to prevent the animal from scratching and/or irritating an area which requires protection and/or requires time to heal free from interference.

The anatomy of a dog, as one good example of a quadruped, permits the dog to move and reach all the way to its hind legs. Dogs have strong muscles and cardiovascular system, but have small, tight feet. This leaves them walking on their toes. Their rear legs are fairly rigid and sturdy, and the front legs are loose and flexible because there is only one muscle connecting them to the torso. Muscles that course from the cranial neck to the shoulder girdle or the rib cage (e.g., brachiocephalicus and rhomboideus capitis) have been found to have relatively long fascicles and low PCSA (physiological cross-sectional area) values and thus appear to be designed for rapid excursions. By contrast, muscles that primarily support the neck and shoulder against gravitational forces (e.g. serratus ventralis and trapezius) have been found to have relatively high PCSA values and short fascicle lengths, and thus have the capacity to generate large forces. The presently designed animal head protection device of the invention, or protective dog collar, is designed to allow optimal comfort for a dog, while also protecting a dog from harming itself and/or irritating a sensitive area of the dog.

Figure 1:
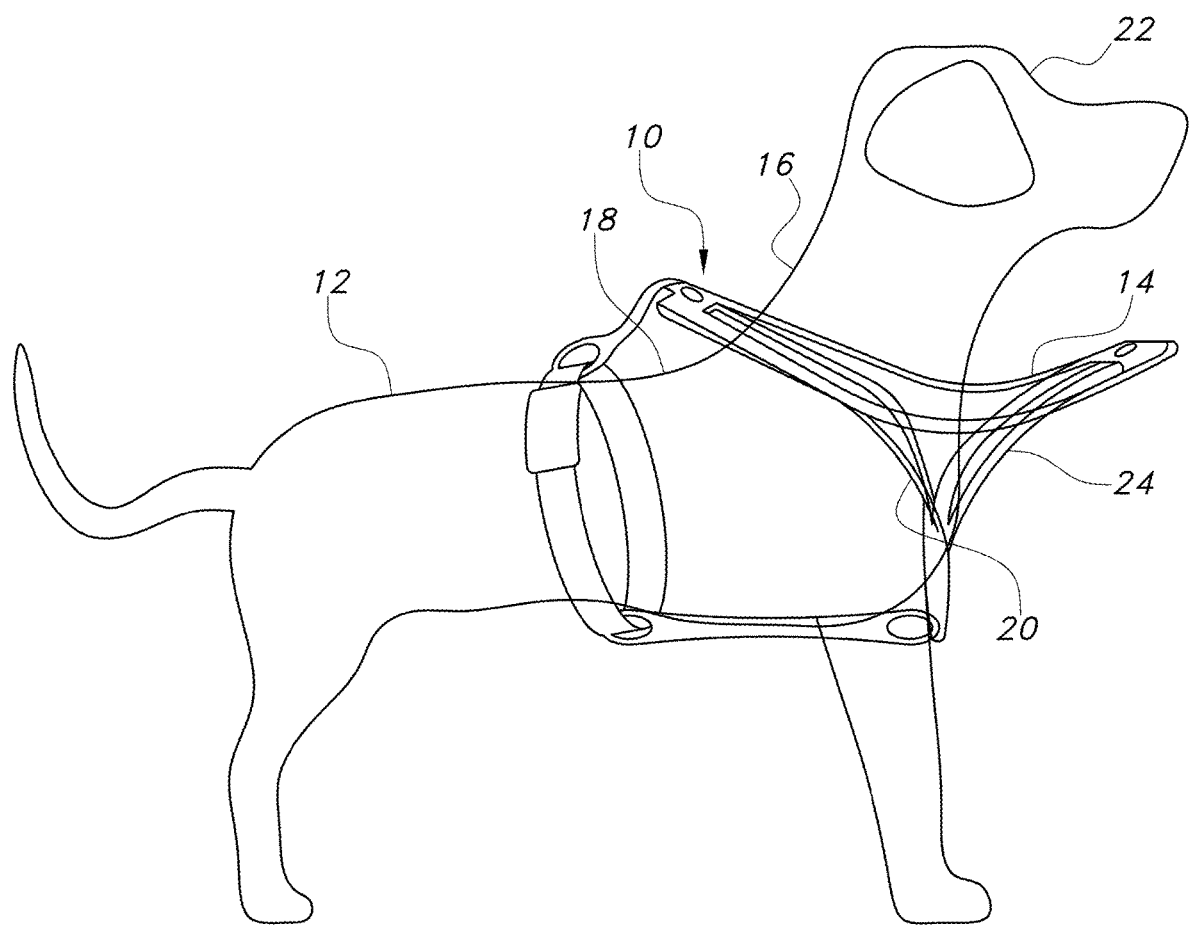
FIG. 1 shows the assembled animal head protection device assembled and in use on a dog.

With reference now to the drawings, FIG. 1 shows a fully assembled animal head protection device 10 on a dog 12. Upper stabilization element (USE) 14 encircles a neck 16 of dog 12. Preferably, USE 14 is wide enough so that neck 16 is not substantially impinged, particularly when dog 12 is stationary. However, if dog 12 rotates neck 16 or moves neck 16 in a direction not desirable, USE 14 can serve as barrier to prevent said movement, while also providing stability for the device to stay on dog 12 by resting on the dog's back 18, or at a position where back 18 meets neck 16 of dog 12.

A lower support structure (LSS) 20 also encircles the neck 16 of dog 12, and a back portion of LSS rests on the back 18 of dog 12 at the same location as USE. As can be seen in FIG. 1, LSS is bent, or flexed rearwardly and downwardly so that it encircles a lower portion of neck 16 lower than USE 14. LSS 20 is made of a flexibly stiff material, so that it can be bent downwardly, yet possess the stiffness so as to prevent a barrier preventing unwanted motion and/or rotation of a head 22 of dog 12. USE 14 provides protection and/or a barrier against downward movement of head 22 of dog 12, and LSS 20 cooperates with USE 14 to maintain positioning on the dog and provide protection and/or a barrier against paws or other elements coming up towards the head 22 of dog 12. Head protection device 10 also prevents over-rotation of dog's body and/or head to reach other areas of dog 12's torso.

Blocking element 24 is also shown in FIG. 1, and is attached to both front ends of USE 14 and LSS 20. Blocking element 24 extends from the front end of LSS 20 and is bent upwards and attached to the front end of USE 14. Blocking element 24 assists by providing further resilience against downward motion of the head 22 of dog 12.

Figure 2:
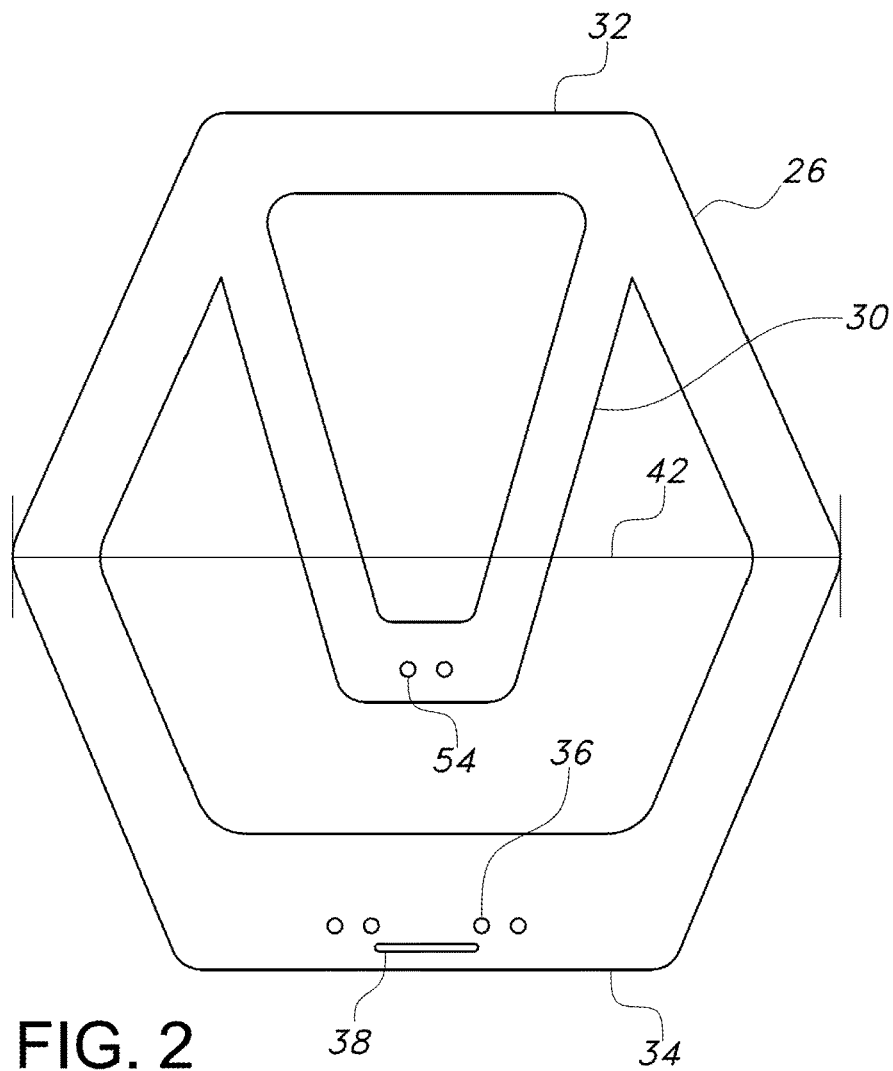
FIG. 2 shows the upper stabilization element of the animal head protection device of the present invention.
Figure 3:
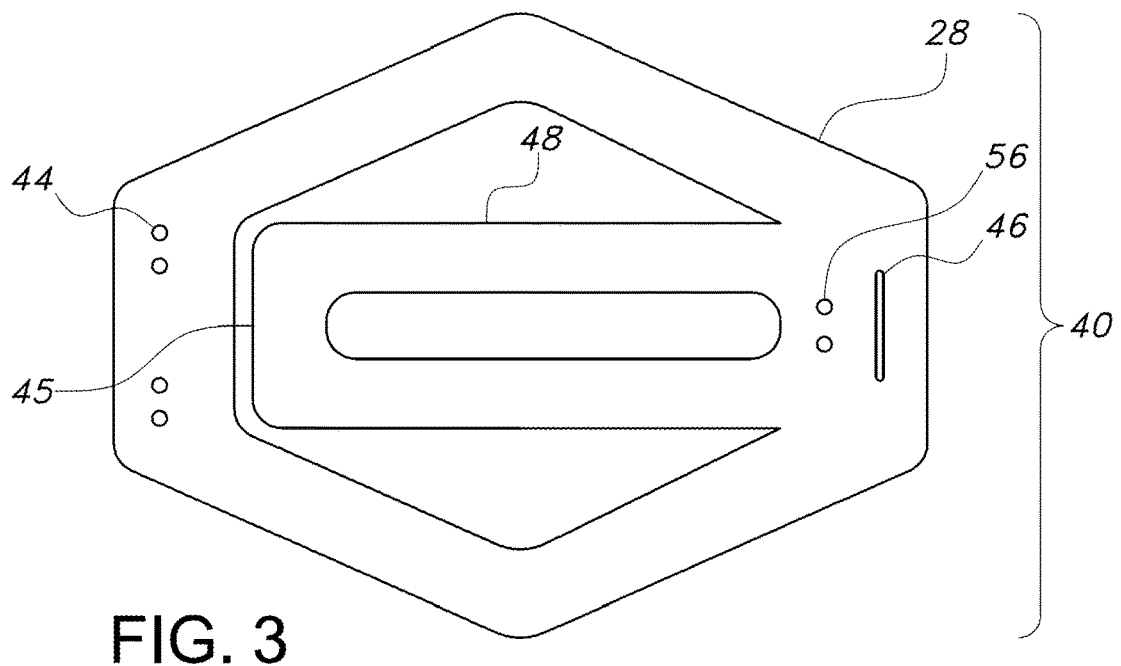
FIG. 3 shows the lower support structure of the animal head protection device of the present invention.

With reference now to FIGS. 2 and 3 of the drawings, another USE 26 and LSS 28 in an inactivated state are shown. USE can be a hexagon-shaped halo which encircles the head of the quadruped (e.g., dog) as shown in FIG. 1. Blocking element shown in FIGS. 2 and 3 has two elements, 30 and 48, which cooperate to provide the required resilience. Element 30 is attached to front end 32 of USE, and protrudes inwardly to the center of the hexagon-shaped halo of USE 26. Blocking element 30 is pyramidal in shape, but is not restricted to this shape. It could be virtually any shape which would allow it to perform its basic functions. Blocking element 48 protrudes from the front portion of LSS into the interior thereof. Blocking element 48 is rectangularly shaped in a preferred embodiment, but is not limited thereto.

Back end 34 of USE 26 is designed to rest on a dog's back or shoulders as seen in FIG. 1. Back end 34 has means of attachment 36 which are used to attach USE 26 to LSS 28. Means of attachment 36 can be snaps or snap-holes which are mated to snap-fit with LSS 28 as is well known in the art. USE 26 also has a slot 38 designed to allow a rope, or harness, pass there through and provide further means for securing device 10 to dog 12.

It is noteworthy that USE 26 and LSS 28 when not in use are flat and easy to store and transport. The ease of use and convenience in storing and transporting are advantages over prior art which are traditionally conical in shape and/or generally more bulky and harder to transport. LSS 28 is also preferably a hexagonally-shaped halo, but could be any shape which could perform its basic functions. LSS has a perimeter which is smaller than the perimeter of USE 26, and as such, can be at least partially inserted within USE 26. LSS 28 has a width 40 which is substantially less than the width 42 of USE so that LSS fits within USE 26 even if the lengths of USE and LSS are substantially similar. LSS also has means of attachment 44 which are used to attach LSS 28 to USE 26. Means of attachment 44 can be snaps or snap-holes which are mated to snap-fit with USE 26 as is well known in the art. LSS also has slot 46 in its front portion designed to allow a rope or harness pass there through. USE 26 and LSS 28 may be constructed of any flexibly rigid polymer, and in a preferred embodiment is made of polyethylene.

Figure 4:
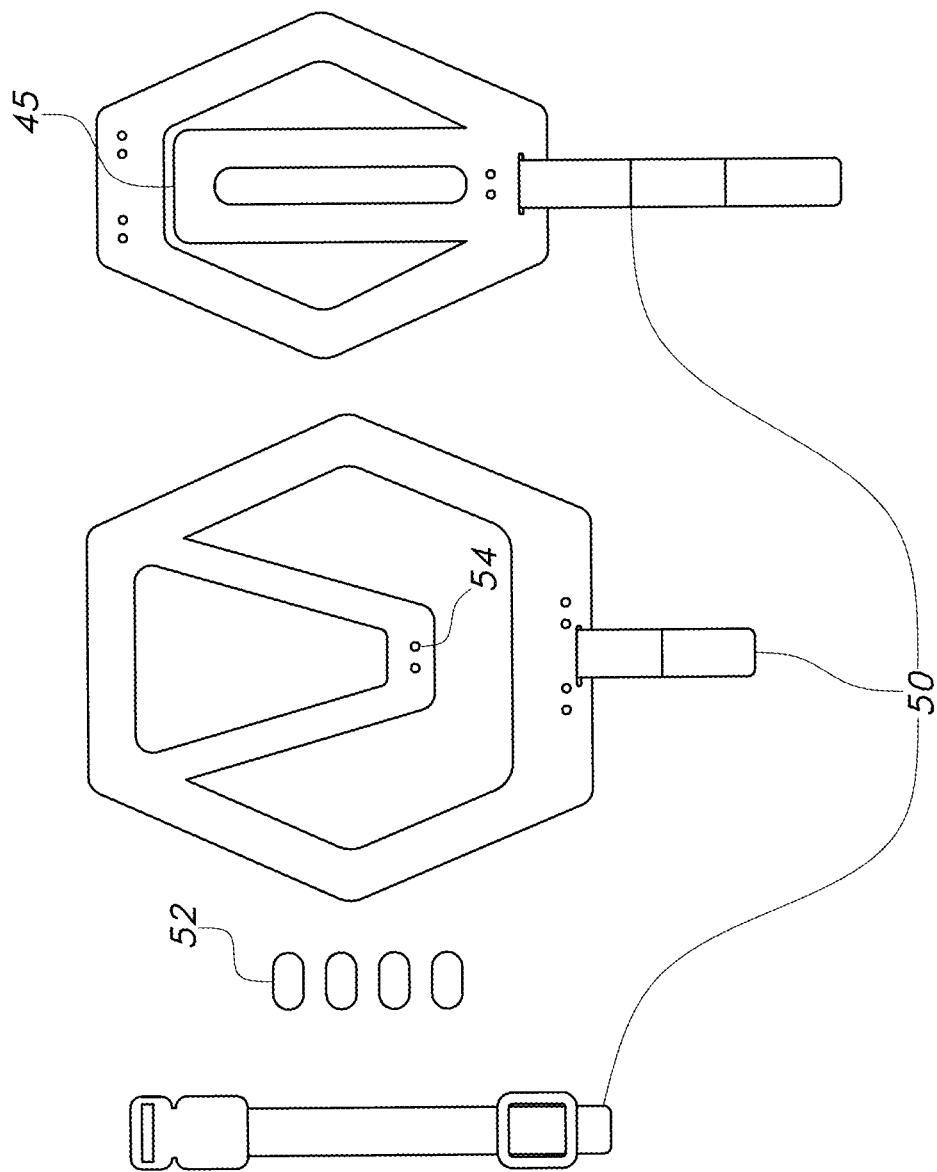
FIG. 4 shows an unassembled collection of parts of the animal head protection device of the present invention.

FIG. 4 shows additional components of device 10 including harness system 50, which includes multiple nylon ropes attached to USE 26 and LSS 28 and also encircling dog 12 as shown in FIG. 1. Snap buttons 52 are buttons with a button with a pair of fiction fitting snaps which may be inserted into snap holes such as those shown at 36 and 44 to append USE 26 and LSS 28 together. Snap buttons 52 also may be inserted into snap holes such as those shown on blocking element at 54 which can append blocking element 30 to LSS 28 at snap holes 56.

Figure 5:
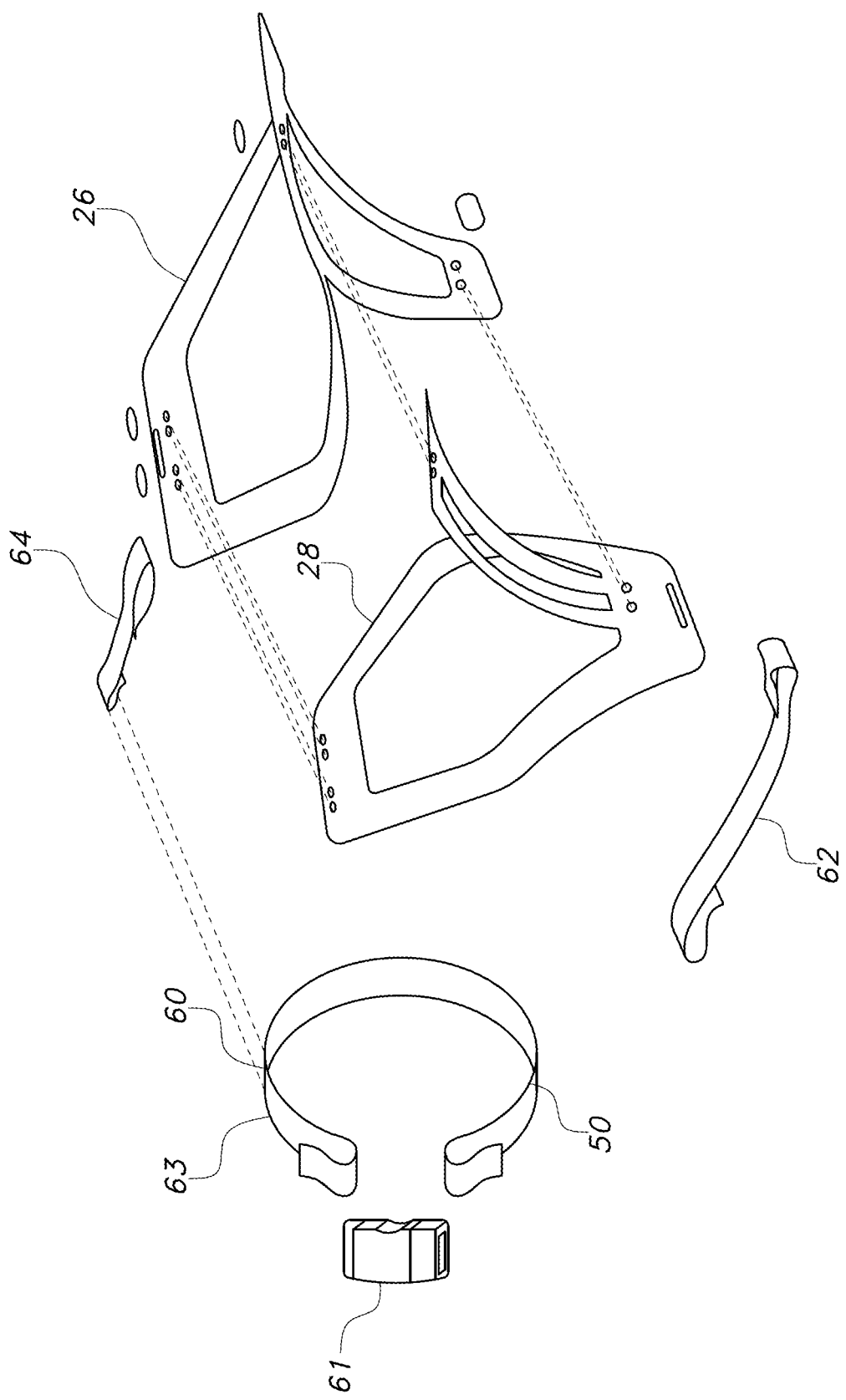
FIG. 5 shows an exploded view of the animal head protection device of the present invention.

With reference now to FIG. 5 of the drawings, an exploded view of the animal head protection device 10 of the present invention is shown. USE 26 and LSS 28 are shown in activated states; i.e., how they would be bent and assembled on a dog. Harness system 50 is also shown including three individual nylon ropes, 60, 62, and 64, which serve to attach the device together and also fit snugly around the belly of the dog (rope 60).

In a preferred embodiment, in order to secure the device to the quadruped, the USE 26 and LSS 28 are provided in the flat and unfolded state as shown in FIGS. 2 and 3. The unclipped shorter edge 45 of LSS 28 is folded through the center of USE 26 to meet the underside of USE 26 and secured thereto by means of snap buttons 52. The assembly of harness system 50 includes 3 1" wide nylon webbing 64 and a 1.5" buckle 61. Nylon webbing 64 is looped into slot 38 on USE (See FIG. 2). An opposite end of Nylon webbing 64 is then looped and sewn to itself to allow harness system 50 and buckle to be inserted through. Additional nylon webbing 62 is looped into slot 46 on LSS (See FIG. 3). An opposite end of additional nylon webbing 62 is looped and sewn to itself to allow harness system 50 and buckle to be inserted through. See FIG. 5, where harness system 50 and a third nylon webbing 63 are fitted to buckle 61. Buckle 61 and third nylon webbing 63 are inserted through open loops on Nylon webbings 62 and 64. The harness systems' buckle 61 is unclipped. To put the device on the quadruped, LSS 28 and USE 26 are snapped together and harness system 50, and buckle 61 are unclipped. USE 26 and LSS 28 are slid over the head of the quadruped and the LSS 28 sits on the shoulders and chest as shown in FIG. 1. The head of the quadruped is guided through LSS 28 followed by USE 26 with the support structure 45 and 54 oriented down, resting on chest, and below chin of quadruped as shown in FIG. 1. LSS 28 rests on front shoulders, chest, and back neck (FIG. 1, 16). FIG. 1, 16 of quadruped is where USE 26 is connected by snap buttons 44 and 36 to LSS 28 (FIG. 1, 10).

Referring to FIGS. 1 and 5, the harness system 50 attached to the base of the LSS 26 sits between the front legs of the quadruped. One leg of the quadruped may be guided through the harness system 50 so that the buckle 61 and loop 63 are clipped together behind the front legs to secure the harness system to the quadruped. Harness system 50 can then be adjusted if necessary. Fully assembled device is shown on a dog in FIG. 1 of the drawings, and in exploded view in FIG. 5 of the drawings.

EXAMPLES

The present invention is further exemplified, but not limited, by the following representative examples, which are intended to illustrate the invention and are not to be construed as being limitations thereto.

The plastic and nylon rope parts of the present invention are made by conventional methods well known to one of skill in the art. For example, the plastic parts may be made by Computer Numerical Control (CNC). The flat patterns of the USE and LSS are built using computer aided design (CAD) and cut using CNC. Edges are filleted to prevent irritation and rubbing. Components of the harness system are sewn to the USE and LSS and connected with an adjustable buckle.

As a result, the present invention creates a comfortable protective dog collar or animal head protection device which pet owners can use post-surgery or during injury recovery in place of the traditional dog cone. The inventive design allows the pet, or dog to see, hear, lay down, and eat without difficulty.

Thus while there have been described what are presently believed to be preferred embodiments of the invention, those skilled in the art will realize that changes and modifications may be made thereto without departing from the spirit of the invention, and it is intended to claim all such changes and modifications as fall within the true scope of the invention.

What is claimed is:

1. An animal head protection device comprising:
   i) an upper stabilization element (USE) having a shape and size for encircling a neck of a quadruped, said USE having a back end and a front end, said USE designed so that said back end rests on the back of said quadruped while said front end is positioned below the head of said quadruped while said USE encircles said neck, wherein said USE comprises a halo having a generally planar body having a top surface and a bottom surface and an opening sufficient for said head of said quadruped to pass therethrough, said opening having perimeter dimension P1;
   ii) a lower support structure (LSS) having a shape and size for encircling said neck and having a back end and a front end, said LSS designed so that said back end rests on the back of said quadruped and is fixed to said back end of said USE while said front end of said LSS is positioned below said front end of said USE while said LSS encircles said neck; and wherein said LSS has a generally planar body having a top surface and a bottom surface and a central opening sufficient to permit passage of the head of said quadruped and a perimeter P2 which is less than said P1 by an amount sufficient to permit said LSS to pass freely through the interior of said USE halo; and
   iii) a blocking element fixed to each of said front end of said USE and said front end of said LSS, whereby said front end of said USE is urged upwardly toward of the head of said quadruped sufficiently to restrict downward movement of said head.

2. The device according to claim 1 wherein said halo is in the shape of a hexagon in plane view.

3. The device according to claim 1 wherein said blocking element comprises a compressible flexible member which has (i) an unactivated position wherein said element is non-compressed and which permits maximum lateral movement of the head of said quadruped and (ii) an activated condition wherein said quadruped lowers its head and exerts downward force on said top surface of said front end of said USE whereby downward movement of said head is restricted.

4. The device according to claim 3 wherein said blocking element comprises a generally planar bendable body having an USE end fixed to said USE and an LSS end fixed to said LSS such that it pushes said USE upwardly from said LSS when activated by downward movement of the head of said quadruped.

5. A device according to claim 4 wherein said blocking element comprises two generally planar bendable bodies fixed between said USE and said LSS.

6. The device according to claim 1 wherein said LSS restricts rotation of the head with respect to the torso of said quadruped.

7. A device according to claim 1 which further comprises a harness attached to said back end of said USE and said front end of said LSS whereby said device can be secured to said quadruped.

8. A device according to claim 1 wherein said USE, said LSS, and said blocking element is comprised of a flexibly stiff polymeric material.

9. The device according to claim 1 wherein said USE and LSS are physically separable elements appended to each other.

10. The device according to claim 9 wherein said USE and LSS are appended to each other via snap-fit at several locations.

\* \* \* \* \*